(12) United States Patent
Spitler et al.

(10) Patent No.: US 7,547,490 B2
(45) Date of Patent: Jun. 16, 2009

(54) HIGH PERFORMANCE LITHIUM TITANIUM SPINEL LI4TI5012 FOR ELECTRODE MATERIAL

(75) Inventors: Timothy Spitler, Fernley, NV (US); Jan Prochazka, Reno, NV (US); Ladislav Kavan, Prague (CZ); Michael Graetzel, Saint-Sulpice (CH); François Sugnaux, Blonay (CH)

(73) Assignee: Altairnano Inc., Reno, NV (US)

( * ) Notice: Subject to any disclaimer, the term of this patent is extended or adjusted under 35 U.S.C. 154(b) by 476 days.

(21) Appl. No.: 10/485,451

(22) PCT Filed: Jul. 29, 2002

(86) PCT No.: PCT/CH02/00425

§ 371 (c)(1),
(2), (4) Date: Jan. 29, 2004

(87) PCT Pub. No.: WO03/012901

PCT Pub. Date: Feb. 13, 2003

(65) Prior Publication Data

US 2004/0197657 A1    Oct. 7, 2004

(30) Foreign Application Priority Data

Jul. 31, 2001    (EP)    ................................ 01810752

(51) Int. Cl.
*C01G 23/00*    (2006.01)
(52) U.S. Cl. ................. 429/231.1; 429/231.5; 423/598; 423/71; 427/126.3; 427/383.1; 428/469; 428/701; 428/702
(58) Field of Classification Search ............ 423/71, 423/598; 427/126.3, 383.1; 428/469, 701, 428/702; 429/231.1, 231.5
See application file for complete search history.

(56) References Cited

U.S. PATENT DOCUMENTS

| | | |
|---|---|---|
| 3,765,921 A | 10/1973 | Puskar |
| 3,903,239 A | 9/1975 | Berkovich |
| 4,012,338 A | 3/1977 | Urwin |
| 4,058,592 A | 11/1977 | Quets |
| 4,065,544 A | 12/1977 | Hamling et al. |
| 4,189,102 A | 2/1980 | Andrews |
| 4,219,164 A | 8/1980 | Taylor |
| 4,482,642 A | 11/1984 | Ettlinger et al. |
| 4,502,641 A | 3/1985 | Coombe |
| 4,546,926 A | 10/1985 | Niemi |
| 4,649,037 A | 3/1987 | Marsh et al. |
| 4,664,319 A | 5/1987 | Andrews |
| 4,842,832 A | 6/1989 | Inoue et al. |
| 4,923,682 A | 5/1990 | Roberts et al. |
| 4,944,936 A | 7/1990 | Lawhorne |
| 4,999,182 A | 3/1991 | Baumard et al. |
| 5,036,037 A | 7/1991 | Kladnig et al. |
| 5,068,056 A | 11/1991 | Robb |
| 5,114,702 A | 5/1992 | Pederson et al. |
| 5,133,504 A | 7/1992 | Smith et al. |
| 5,160,712 A | 11/1992 | Thackeray et al. |
| 5,173,455 A | 12/1992 | Terbot et al. |
| 5,256,954 A | 10/1993 | Chen |
| 5,478,671 A | 12/1995 | Idota |
| 5,545,468 A * | 8/1996 | Koshiba et al. .......... 429/231.1 |
| 5,550,095 A | 8/1996 | Naito et al. |
| 5,562,763 A | 10/1996 | Bruckner et al. |
| 5,654,114 A | 8/1997 | Kubota et al. |
| 5,698,177 A | 12/1997 | Pratsinis et al. |
| 5,698,205 A | 12/1997 | Bruckner et al. |
| 5,714,260 A | 2/1998 | Okuda et al. |
| 5,766,796 A | 6/1998 | Abraham et al. |
| 5,770,310 A | 6/1998 | Noguchi et al. |
| 5,807,532 A | 9/1998 | Takahashi et al. |
| 5,833,892 A | 11/1998 | Gurav et al. |
| 5,840,111 A | 11/1998 | Wiederhoft et al. |
| 6,001,326 A | 12/1999 | Kim et al. |
| 6,037,289 A | 3/2000 | Chopin et al. |

(Continued)

FOREIGN PATENT DOCUMENTS

DE    4447578 A1    4/1996

(Continued)

OTHER PUBLICATIONS

Structure and Electrochemistry of the Spinel Oxides $LiTi_2O_4$ and $Li_{4/3}Ti_{5/3}O_4$, K.M. Colbrow, J.R. Dahn and R.R. Haering, *Journal of Power Sources*, 26 (1989) May 16, Nos. 3/4, pp. 397-402.
Harrison, M.R. et al (1985). "The Superconductor Transition in the $Li_{1+x}Ti_{2-x}O_4$ Spinel System," *Philosphical Magazine B* 52:678-699.
International Search Report and Written Opinion mailed Sep. 24, 2007, for PCT Application No. PCT/US06/60164 filed Oct. 23, 2006, 9 pages.
International Search Report mailed Jul. 15, 2003, for PCT Application No. PCT/US03/06989 filed Mar. 7, 2003, 3 pages.
International Search Report mailed Oct. 28, 2002, for PCT Application No. PCT/US02/23037 filed Jul. 19, 2002, 3 pages.
International Search Report mailed on Nov. 11, 2002, for PCT Application No. PCT/CH02/00425 filed on Feb. 13, 2003, 3 pages.
Kavan, L. et al. (2000) "Surfactant-Templated $TiO_2$ (Anatase): Characteristic Features of Lithium Insertion Electrochemistry in Organized Nanostructures," *Journal of Physical Chemistry B* 104(50):12012-12020.

(Continued)

*Primary Examiner*—Steven Bos
(74) *Attorney, Agent, or Firm*—Jay R Akhave

(57) ABSTRACT

The invention concerns a process for producing a spinel compound of formula $Li_4Ti_5O_{12}$, comprising a step of preparing a mixture of an organo-lithium compound selected from lithium alcoholates with an organo-titanium compound selected from titanic acid esters, in a liquid medium, and a step of hydrolyzing the mixture of said compounds. The invention also concerns a $Li_4Ti_5O_{12}$ particulate material which may be produced according to the previous cited process and which has a BET surface area of at least 10 $m^2/g$. The material is particularly useful in the manufacture of Lithium Ion batteries.

6 Claims, 8 Drawing Sheets

U.S. PATENT DOCUMENTS

| | | | |
|---|---|---|---|
| 6,080,510 A * | 6/2000 | Hemmer et al. | 429/224 |
| 6,099,634 A | 8/2000 | Uenishi et al. | |
| 6,139,815 A | 10/2000 | Atsumi et al. | |
| 6,168,884 B1 * | 1/2001 | Neudecker et al. | 429/162 |
| 6,274,271 B1 * | 8/2001 | Koshiba et al. | 429/231.1 |
| 6,310,464 B1 | 10/2001 | Koo | |
| 6,348,182 B1 | 2/2002 | Lu et al. | |
| 6,375,923 B1 | 4/2002 | Duyvesteyn et al. | |
| 6,379,843 B1 | 4/2002 | Yamasaki et al. | |
| 6,409,985 B1 | 6/2002 | Numata et al. | |
| 6,440,383 B1 | 8/2002 | Duyvesteyn et al. | |
| 6,447,739 B1 | 9/2002 | Krynitz et al. | |
| 6,475,673 B1 | 11/2002 | Yamawaki et al. | |
| 6,548,039 B1 | 4/2003 | Duyvesteyn et al. | |
| 6,615,118 B2 | 9/2003 | Kumar | |
| 6,645,673 B2 | 11/2003 | Yamawaki et al. | |
| 6,673,491 B2 | 1/2004 | Shirakawa et al. | |
| 6,680,041 B1 | 1/2004 | Kumar et al. | |
| 6,689,716 B2 | 2/2004 | Sabacky et al. | |
| 6,719,821 B2 | 4/2004 | Yadav et al. | |
| 6,737,037 B2 | 5/2004 | Ramasamy et al. | |
| 6,749,648 B1 | 6/2004 | Kumar et al. | |
| 6,759,168 B2 | 7/2004 | Yamasaki et al. | |
| 6,789,756 B2 | 9/2004 | Beliavsky et al. | |
| 6,790,243 B2 | 9/2004 | Vaidyanathan | |
| 6,881,393 B2 | 4/2005 | Spitler et al. | |
| 6,890,510 B2 | 5/2005 | Spitler et al. | |
| 6,908,711 B2 | 6/2005 | Fauteux et al. | |
| 6,974,566 B2 | 12/2005 | Sabacky et al. | |
| 6,982,073 B2 | 1/2006 | Sabacky et al. | |
| 7,026,074 B2 | 4/2006 | Chen et al. | |
| 7,060,390 B2 | 6/2006 | Chen et al. | |
| 7,087,349 B2 | 8/2006 | Kim et al. | |
| 7,101,642 B2 | 9/2006 | Tsukamoto et al. | |
| 7,115,339 B2 | 10/2006 | Nakajima et al. | |
| 2001/0031401 A1 * | 10/2001 | Yamawaki et al. | |
| 2005/0088140 A1 | 4/2005 | Bushong et al. | |
| 2005/0169833 A1 | 8/2005 | Spitler et al. | |
| 2005/0186481 A1 | 8/2005 | Ogawa et al. | |
| 2006/0093894 A1 | 5/2006 | Scott et al. | |
| 2006/0286456 A1 | 12/2006 | Fu et al. | |
| 2007/0092798 A1 | 4/2007 | Spitler | |

FOREIGN PATENT DOCUMENTS

| | | |
|---|---|---|
| DE | 19725616 C1 | 11/1998 |
| DE | 19837625 A1 | 3/1999 |
| EP | 0016583 B1 | 10/1983 |
| EP | 0090913 B1 | 8/1986 |
| EP | 0 617 474 A1 | 9/1994 |
| EP | 0356132 B1 | 4/1995 |
| EP | 0646974 B1 | 9/1997 |
| EP | 0 827 231 A1 | 3/1998 |
| EP | 0 845 825 A1 | 6/1998 |
| EP | 0832847 B1 | 4/2002 |
| EP | 1026765 B1 | 11/2004 |
| EP | 1057783 A2 | 12/2006 |
| GB | 481892 | 3/1938 |
| GB | 497694 | 12/1938 |
| GB | 2166126 A | 4/1986 |
| GB | 2328684 A | 3/1999 |
| JP | 58-015031 | 1/1983 |
| JP | 03-115106 | 5/1991 |
| JP | 06-275263 | 9/1994 |
| JP | 09-309727 | 12/1997 |
| JP | 10-064592 | 3/1998 |
| JP | 10-069922 | 3/1998 |
| JP | 10-509683 | 9/1998 |
| JP | 2000-302547 | 10/2000 |
| JP | 2002-289194 | 10/2002 |
| SU | 1457995 A1 | 2/1989 |
| WO | WO-94/08719 A1 | 4/1994 |
| WO | WO-97/10185 A1 | 3/1997 |
| WO | WO-97/30130 A1 | 8/1997 |
| WO | WO-98/37023 A1 | 8/1998 |
| WO | WO-96/41476 A1 | 9/1998 |
| WO | WO-98/52694 A1 | 11/1998 |
| WO | WO-01/00531 A1 | 1/2001 |
| WO | WO-01/60515 A2 | 8/2001 |
| WO | WO-02/09215 A2 | 1/2002 |
| WO | WO-02/46101 A2 | 6/2002 |
| WO | WO-2004/097961 A2 | 11/2004 |
| WO | WO-2007/048142 A2 | 4/2007 |

OTHER PUBLICATIONS

Kavan, L. et al. (Feb. 1996), "Nanocrystalline TiO$_2$ (Anatase) Electrodes: Surface Morphology, Adsorption, and Electrochemical Properties," *Journal of the Electrochemical Society* 143(2):329-400.

Lundblad, A. et al. (2000), "Effect of Sintering Procedures in Development of LiCoO$_2$-Cathodes for the Molten Carbonate Fuel Cell," *Journal of Power Sources* 90:224-230.

Ohzuku, T. et al (May 1995). "Zero-Strain Insertion Material of Li[Li$_{1/3}$Ti$_{5/3}$]O$_4$ for Rechargeable Lithium Cells," *Journal of the Electrochemical Society* 142(5):1431-1435.

Peramunage, D. et al. (1998). "Preparation and Battery Applications of Micron Sized Li$_4$Ti$_5$O$_{12}$," *Materials Research Society Symposium Proceedings* 498:359-365.

Peramunage, D. et al. (Aug. 1998). "Preparation of Micron-Sized Li$_4$Ti$_5$O$_{12}$ and its Electrochemistry in Polyacrylontrile Electrolyte-Based Lithium Cells," *Journal of the Electrochemical Society* 145(8):2609-2615.

Prosini, P. P. et al. (2001). "Li$_4$Ti$_5$O$_{12}$ as Anode on All-Solid State, Plastic, Lithium-Ion Batteries for Low-Power Applications," *Solid State Ionics* 144:185-192.

Pyun, S.-I, et al. (1999), "Lithium Transport Through Li$_{1+\delta}$[Ti$_{2-y}$Li$_y$]O$_4$ (y=0; 1/3) Electrodes by Analysing Current Transients Upon Large Potenrial Steps," *Journal of Power Sources* 81-82:248-254.

Robertson, A. D. et al. (1999). "New Inorganic Spinel Oxides for Use as Negative Electrode Materials in Future Lithium-Ion Batteries," *Journal of Power Sources* 81-82:352-357.

U.S. Appl. No. 12/016,973, filed Jan. 18, 2008 for House.

U.S. Appl. No. 12/016,977, filed Jan. 18, 2008 for House.

U.S. Appl. No. 12/056,218, filed Mar. 26, 2008 for Manev et al..

Zaghib, K. et al. (1999). "Elecotochemical Study of Li$_4$Ti$_5$O$_{12}$ as Negative Electrode for Li-Ion Polymer Rechargeable Batteries," *Journal of Power Sources* 81-82:300-305.

Allen, J. L. et al. (2006). "Low Temperature Performance of Nanophase Li$_4$Ti$_5$O$_{12}$," *Journal of Power Sources* 159:1340-13453.

Fong, R. et al. (Jul. 1990). "Studies of Lithium Intercalation into Carbons Using Nonaqueous Electrochemical Cells," *The Journal of the Electrochemical Society* 137(7):2009-20013.

International Search Report and Written Opinion mailed Jun. 2, 2008, for PCT Application No. PCT/US2008/051509 filed Jan. 18, 2008, 21 pages.

International Search Report and Written Opinion mailed Jun. 2, 2008, for PCT Application No. PCT/US2008/051515 filed Jan. 18, 2008, 21 pages.

U.S. Office Action mailed Jun. 6, 2008, for U.S. Appl. No. 11/088,529 filed Mar. 24, 2005, 8 pages.

International Search Report and Written Opinion mailed Aug. 19, 2008, for PCT Application No. PCT/US08/65693 filed Jun. 3, 2008, 9 pages.

International Search Report and Written Opinion mailed Sep. 19, 2008, for PCT Application No. PCT/US08/66936 filed Jun. 13, 2008, 7 pages.

* cited by examiner

HIGH PERFORMANCE LITHIUM TITANIUM SPINEL LI4TI5012 FOR ELECTRODE MATERIAL

This application claims priority to EP application 01810752.4 filed Jul. 31, 2001, and to International Application No. PCT/CH02/00425 filed Jul. 29, 2002 and published in English on Feb. 13, 2003, the entire contents of both are incorporated herein by reference.

FIELD OF THE INVENTION

The invention relates to a Lithium Titanate Spinel oxide material, more precisely a $Li_4Ti_5O_{12}$ material, which may be used in energy storage devices and more specifically in cathodes and anodes of Lithium Ion batteries or of hybrid capacitance devices.

The invention also concerns a process which may be used for obtaining a $Li_4Ti_5O_{12}$ spinel material.

STATE OF THE ART

Spinel oxides $Li_{1+x}Ti_{2-x}O_4$; $0 \leq x \leq 1/3$ (space group Fd3 m) were described in 1971 and electrochemically characterized in the early 1990s (K. M: Colbow, J. R. Dahn and R. K Haering, J. Power Sources, 26,397 (1989) and T. Ohzuku, A. Ueda and N. Yamamoto, J. Electrochem. Soc., 142,1431 (1995)). The end members of the series, i.e. $LiTi_2O_4$ and $Li_{4/3}Ti_{5/3}O_4$ ($Li_4Ti_5O_{12}$) are metallic (super-conducting below 11 K) and semi-conducting, respectively (M. R. Harrison, P. P. Edwards and J. B. Goodenough, Phil Mag. B, 52, 679 (1985)). Both materials exhibit similar Li-insertion electrochemistry, the formal potential of Li-insertion being (1.36-1.338) V for $LiTi_2O_4$ and (1.55-1.562) V for $Li_4Ti_5O_{12}$, respectively (S. I. Pyun, S. W. Kim and H. C. Shin, J. Power Sources, 81-82,248 (1999)).

In principle, therefore, this latter material can be coupled with a 4V electrode, as $LiMn_2O_4$ or $LiCoO_2$, to provide a cell with an operating voltage of approximately 2.5V, which is twice that of nickel-cadmium or nickel-metal hydride cells.

$Li_4Ti_5O_{12}$ accommodates Li with a theoretical capacity of 175 mAh/g (.based on the mass of the starting host material) according to the equation:

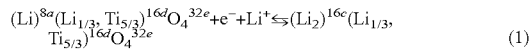

(1)

where the superscripts stand for the number of equivalent sites with Wyckoff symbols for the space group Fd3m. Hence, $Li^+$ occupies tetrahedral (8a) and octahedral (16c, 16d) sites of the lattice, and the overall insertion capacity is controlled by the number of free octahedral sites. A more detailed analysis points at two-phase equilibrium, which explains the invariance of the electrode potential on the electrode composition. The spinel host structure accommodates $Li^+$ without significant changes of lattice constants. Consequently, these materials show excellent cycle life and the $Li^+$ diffusion coefficient of about $2.10^{-8}$ cm$^2$/s was reported (K. Zaghib, M. Simoneau, M. Armand and M. Gauthier, J. Power Sources, 81-82, 300 (1999)). For an entire battery, both anode and cathode active materials, the charge/discharge cycle may be simply represented by the following equation.

[1a]

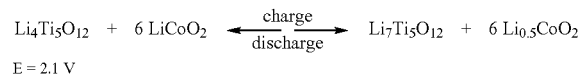

$E = 2.1 V$

In previous communications the spinel $Li_4Ti_5O_{12}$ was prepared by a solid-state reaction of stoichiometric amounts of $TiO_2$ and $Li_2CO_3$ or LiOH; the reaction typically occurs within 12-24 hours at 800-1000° C.

A $Li_4Ti_5O_{12}$ material with smaller particle size was prepared by high-energy ball milling of the conventional microcrystalline spinel. The product exhibited particles around 600 nm in size, but its electrochemical performance was not significantly different from that of the non-milled starting material.

The above-mentioned $Li_4Ti_5O_{12}$ materials suffer from relatively low Li-insertion capacity at high charging rates. Therefore, there is a need for $Li_4Ti_5O_{12}$ electrode materials with improved electrochemical performance.

SUMMARY OF THE INVENTION

The inventors unexpectedly found that $Li_4Ti_5O_{12}$ material made of nano-sized particles which—according to the nitrogen absorption surface area measurement method of Brunauer-Emmet-Teller (BET method)—have a BET surface area of at least 10 m$^2$/g (i.e. corresponding to particles having a theoretical size of less than 100 nm) exhibit different Li-insertion electrochemistry and show specific electrochemical performances.

In one embodiment of the invention the particles are characterized by a BET surface of between 10 and 200 m$^2$/g.

In another embodiment the particles are characterized by a BET surface area of between 20 and 160 m$^2$/g.

In another embodiment the particles have a BET surface between 30 and 140 m$^2$/g.

In a preferred embodiment the particles are characterized by a BET surface area of between 70 and 110 m$^2$/g.

For producing the above cited nano-sized particles the inventors developed new synthetic methods.

The conversion of nanocrystalline $TiO_2$ (anatase) towards $Li_4Ti_5O_{12}$ was first explored by a reaction of colloidal $TiO_2$ with LiOH. However, this strategy was not successful, neither its variants employing $Li_2CO_3$, $LiCH_3COO$ and $LiNO_3$ in combination with the stoichiometric amount of colloidal anatase in acidic or alkaline media at temperatures up to 250° C. (in autoclave). In all cases, the product contained $Li_{1+x}Ti_{2-x}O_4$ with considerable amounts of unreacted anatase.

The inventors solved the problem by developing a method comprising a step of mixing an organo-lithium compound selected from lithium alcoholates with an organo-titanium compound selected from titanic acid esters in an organic solvent and a step of hydrolyzing said mixture. Particularly preferred alkoxides as starting reagents are Li-ethoxide and Ti(IV)isopropoxide and Ti(IV) n-butoxide. Preferably, the organo-lithium compound and the organo-titanium compound are mixed in a stoichiometric molar ratio substantially equal to 4:5. For some contemplated applications, defined mixtures of anatase and lithium titanate spinel are desirable. These may be obtained by appropriate ratios differing from the above molar ratio.

After hydrolysis, isolation and drying of the precipitate, spinel products were obtained which exhibit BET surface area values of at least 5 m$^2$/g, and generally above 10 m$^2$/g, which correspond to much smaller particle sizes than the particles sizes of state of the art microcrystalline $Li_4Ti_5O_{12}$ materials. However, after alkoxide hydrolysis, the slurry still contains appreciable mounts of unreacted anatase. Therefore, a preferred embodiment of the process according to the invention further comprises the steps of processing the hydrolyzed mixture with a polymer like polyethyleneglycol (PEG) up to homogeneity, and submitting the homogenized product to a heat treatment effective for removing organic material therefrom. This polymer is known to form complexes with lithium and oxo-titanium species, while It may also organizes the inorganic structure by supramolecular templating (L. Kavan, J. Rathousky, M. Grätzel, V. Shklover and A. Zukal, J. *Phys. Chem. B,* 104, 12012 (2000)). After processing the hydrolyzed mixture with PEG and removing the same by annealing, pure spinel materials could be obtained. Materials exhibiting unexpected extremely high BET surface area values of more than 80 m$^2$/g may be obtained.

An additional object of the invention is an electrode comprising a nano-structured $Li_4Ti_5O_{12}$ material exhibiting BET values as above. The PEG processing step and the annealing/sintering step may be conducted to obtain BET values which may range between 50 m$^2$/g and 200 m$^2$/g, corresponding then to values well suitable for electrodes.

A preferred object of the invention is a thin film electrode obtained by coating a conductive support with a hydrolyzed mixture produced by a process as defined above and submitting said coated support to a heat treatment. A particularly preferred thin film electrode is obtained by coating a conductive support with the homogenized product produced by processing the hydrolyzed mixture with PEG, and submitting said coated support to an annealing treatment.

Such annealing treatments may be carried out at 400-500° C., that is to say at much lower temperatures than the solid state spinel preparations of the prior art.

Thus, the invention provides electroactive ion-insertion materials based on nanostructured, tetra-Lithium Titanate spinel allowing extremely high charge and discharge rates, a high number of charge, discharge cycles, Mesoporous electrode materials thereof and processes to produce these materials, including precipitation from a solution, doping with metallic atoms, nano-templating, Microparticles agglomeration, spray-drying, ball-milling and sintering.

This invention also provides electrodes, i.e. anode or cathode, based on nanostructured lithium titanate spinel, and their manufacturing process to build these as rigid films made from nanoparticles of the electroactive material or as flexible layers made from Mesoporous microparticles of the electroactive nanostructured material. Such Microparticles may be obtained from agglomerated and sintered lithium titanate spinel precipitated particles, which are spray dried, processed with an organic binder and coated onto a conductive substrate.

It should also be noted that the invention is not limited to a specific process such as the one previously discussed. Several other processes may be used and in particular the Altair processes disclosed in U.S. patent applications 60/306,683 and 60/362,723.

Other features and advantages of the process and products according to the invention will appear to those skilled in the art from the following detailed description and related non limitative examples.

BRIEF DESCRIPTION OF THE DRAWINGS

FIG. 1 shows a powder extract X-ray diffractogram of $Li_4Ti_5O_{12}$ prepared from Ti(IV) butoxide+Li ethoxide; (A) Material synthesized by the procedure using PEG (BET surface area 183 m$^2$/g); (B) Material prepared as in (A) except the addition of PEG was omitted; (C) Material prepared as in (A) but with the aid of hydrothermal growth of particles (150° C., 10 hours, BET surface area, 119 m$^2$/g). The curves are offset for clarity, but the intensity scale is identical for all three plots.

FIG. 2 shows cyclic voltammogram of $Li_4Ti_5O_{12}$ prepared from Ti(IV) butoxide-Li ethoxide. Electrolyte solution: 1 M $LiN(CF_3SO_2)_2$+EC/DME (1:1 by mass); scan rate 0.2 mV/s. Dashed curve displays the same plot, but with the current-scale expanded by a factor of 10.

FIG. 3 shows a chronopotentiometric plot of (A) $Li_4Ti_5O_{12}$ prepared from Ti(IV) butoxide-Li ethoxide compared to (B) commercial $Li_4Ti_5O_{12}$ spinel (LT-2 from Titan Kogyo Japan). Electrolyte solution: 1 M $LiN(CF_3SO_2)_2$+EC/DME (1:1 by mass). The current i was adjusted to charging rate of 2 C, 5 C, 100 C, 150 C, 200 C and 250 C for solid curves from top to bottom. Dashed curves display the corresponding galvanostatic discharging at the same rates. For the sake of clarity, the time (t) is multiplied by the absolute value of charging/discharging current i.

Figure 1:
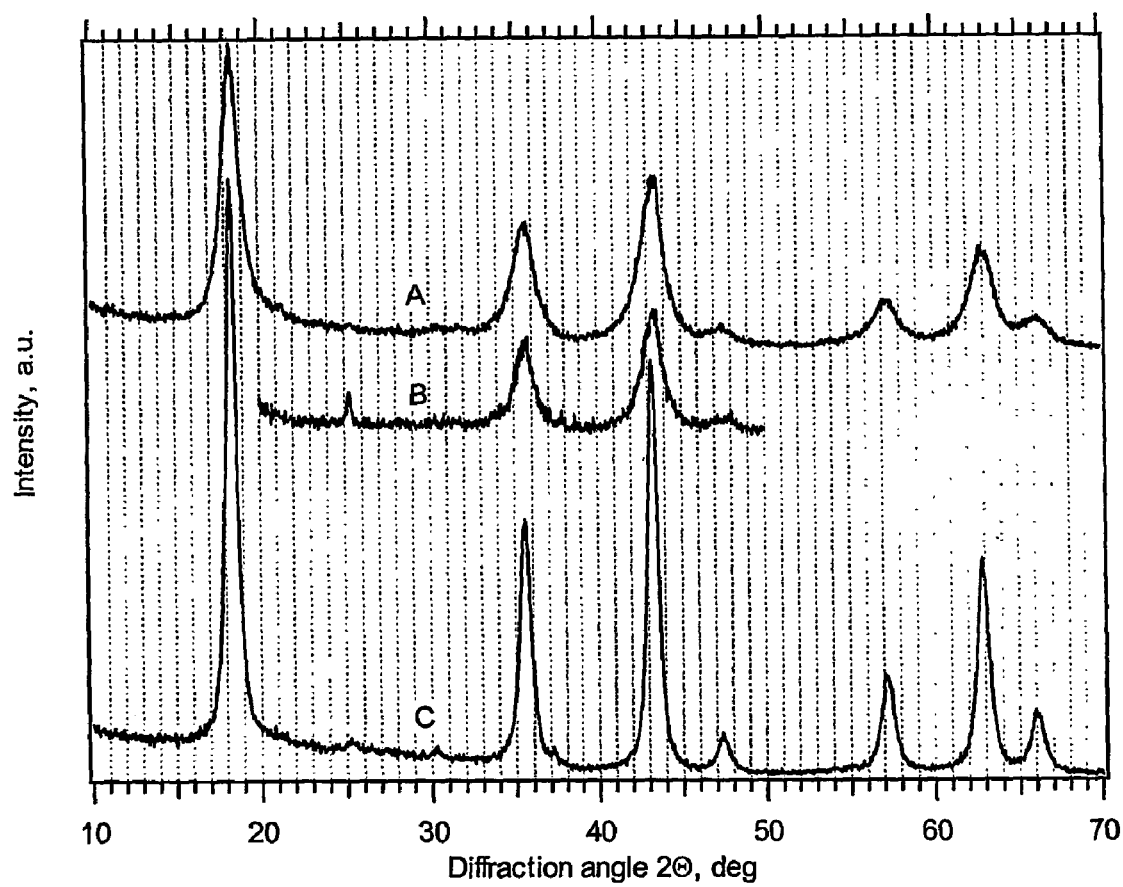
FIG. 1 shows three X-rays diffractograms of a material according to the invention obtained with different processes.

Under Ar-atmosphere, 1.4 g (0.2 mol) of lithium metal (Aldrich) was dissolved in 110 ml of absolute ethanol and mixed with 71 g (0.25 mol) of titanium (IV) isopropoxide (pract Fluka) or, alternatively, with 85 g (0.25 mol) of titanium (IV) n-butoxide (pract. Fluka). Still another alternative consisted in using lithium ethoxide or lithium methoxide powders from Aldrich.s 50 mL of the solution of Li+Ti alkoxides was hydrolyzed in 300 mL of water, and the produced slurry was concentrated on rotary evaporator (40° C. 20 mbar) to a concentration of 10-20 wt %. Polyethylene glycol (molecular weight 20 000, Merck) was added in the proportion of 50-100% of the weight of $Li_4Ti_5O_{12}$, and the mixture was stirred overnight. The resulting viscous liquid was deposited on a sheet of conducting glass (F-doped $SnO_2$, TEC 8 from Libbey-Owens-Ford, 8 Ω/square) using a doctor-blading technique (L. Kavan, M. Grätzel. J. Rathousky and A. Zukal, *J. Electrochem. Soc.,* 143, 394 (1996)) and finally annealed at 500° C. for 30 min. Sometimes, the slurry was homogenized using a titanium ultrasonic horn (Bioblock Scientific; 80 W, 30×2 s pulses) before deposition. The mass of active electrode material was typically 0.1-0.3 mg/cm$^2$; the projected electrode area 1 cm$^2$ and the layer thickness about 2-6 μm. For comparison, an analogous electrode was prepared from commercial $Li_4Ti_5O_{12}$ (LT-2 from Titan Kogyo Japan). The material had a BET surface of 2.9 m$^2$/g (manufacturer's specification; 3.1 m$^2$/g by own measurement). The LT-2 powder was dispersed by mortaring with acetylacetone, and the paste for doctor-blading was prepared by addition of hydroxypropyl-celulose and Triton X-100 as described elsewhere (L. Kavan, M. Grätzel. J. Rathousky and A. Zukal, *J. Electrochem. Soc.,* 143, 394 (1996))

The BET surface areas of the prepared materials were determined from nitrogen adsorption isotherms at 77 K (ASAP 2010, Micromeritics). The film thickness was measured with an Alpha-step profilometer (Tencor Instruments). Powder X-ray diffractometry (XRD) was studied on a Siemens D-5000 difractometer using CuKα radiation. The samples for BET and XRD were obtained by mechanical scraping of the film from a glass support.

The BET surface areas of the as-prepared materials were 105 m$^2$/g (synthesis employing Ti(IV) isopropoxide) and 153-196 m$^2$/g(synthesis employing Ti(IV) butoxide), respectively. If the slurry was autoclaved at 150° C. for 10 hours, the surface areas decreased to 53 m$^2$/g (isopropoxide-synthesis) or 119 m$^2$/g (butoxide-synthesis), which is due to hydrothermal particle growth by Ostwald ripening.

Fig I/(A) shows the X-ray diffractogram of a material resulting from the butoxide-synthesis (surface area 183 m$^2$/g). All peaks can be indexed as $Li_4Ti_5O_{12}$. The crystal size ($d_c$) can be estimated from the X-ray line width (w) (Scherrer formula):

$$d_c = 0.9\lambda/w \cos\theta \tag{2}$$

($\lambda$ is the X-ray wavelength (0.1540562 nm) and $\theta$ is the diffraction angle). Eq. (2) gives $d_c$ about 4-5 nm. This value roughly matches the particle size ($d_p$) estimated from BET area (S=183 m$^2$/g). Assuming spherical particles, the value of $d_p$ can be approximated as:

$$d_p = 6/S\rho \tag{3}$$

which gives $d_p \approx 9$ nm for S=183 m$^2$/g and $\rho$=3.5 g/cm$^3$. Analogous evaluation routine for the ex-propoxide material produces $d_c \approx 15$ nm and $d_p \approx 19$ nm. FIG. 1/(B) shows the XRD plot for a material prepared as that in FIG. 1/(A) except that the addition of polyethylene glycol was omitted. In this case, anatase is clearly distinguished at 2θ≈25 deg. FIG. 1/(C) displays the XRD plot for a material prepared as that in FIG. 1/(A), but the particles were grown hydrothermally (the product's surface area was 119 m$^2$/g, $d_c \approx d_p \approx 14$ nm). The lattice constant of the hydrothermally grown material (FIG. 1/(C)) equals 0.8366 nm, which is in good agreement with the lattice constant of $Li_4Ti_5O_{12}$ made by the conventional high-temperature synthesis: 0.8367, 0.8365 and 0.8358. However, the lattice constant of the nanocrystalline materials (without hydrothermal growth, cf. FIG. 1/(A)) is significantly smaller. The actual values fluctuate between 0.8297 nm to 0.8340 nm for various samples, both from the butoxide-and isopropoxide-synthesis.

Whereas the lattice constant, a, of a $Li_{1+x}Ti_{2-x}O_4$ spinel is known to decrease with x (ref.) (M. R. Harrison, P. P. Edwards and J. B. Goodenough, *Phil Mag. B*, 52, 679 (1985)) according to the relation:

$$\alpha = 0.8405 - 0.0143x \tag{4}$$

this reasoning cannot account for the observed decrease of a for the nanocrystalline material according to the invention. The latter conclusion is supported by two arguments: (i) the lattice constant attains its "normal" value after hydrothermal growth and (ii) the nanocrystalline material according to the invention shows the electrochemistry of a Li-rich spinel, vide infra. It may be noticed that a 5 nm-sized particle of $Li_4Ti_5O_{12}$ contains about 200 unit cells only, and such a small particle exhibits marked lattice-shrinking.

Electrochemical measurements were carried out in a one-compartment cell using an Autolab Pgstat-20 controlled by GPES-4 software. The reference and auxiliary electrodes were from Li metal, hence potentials are referred to the Li/Li$^+$ (1 M) reference electrode. $LiN(CF_3SO_2)_2$ (Fluorad HQ 115 from 3M) was dried at 130° C./1 mPa. Ethylene carbonate (EC) and 1,2-dimethoxyethane (DME) were dried over the 4A molecular sieve (Union Carbide). The electrolyte solution, 1 M $LiN(CF_3SO_2)_2$+EC/DME (1/1 by mass) contained 10-15 ppm $H_2O$ as determined by Karl Fischer titration (Metrohm 684 coulometer). All operations were carried out in a glove box.

Figure 2:
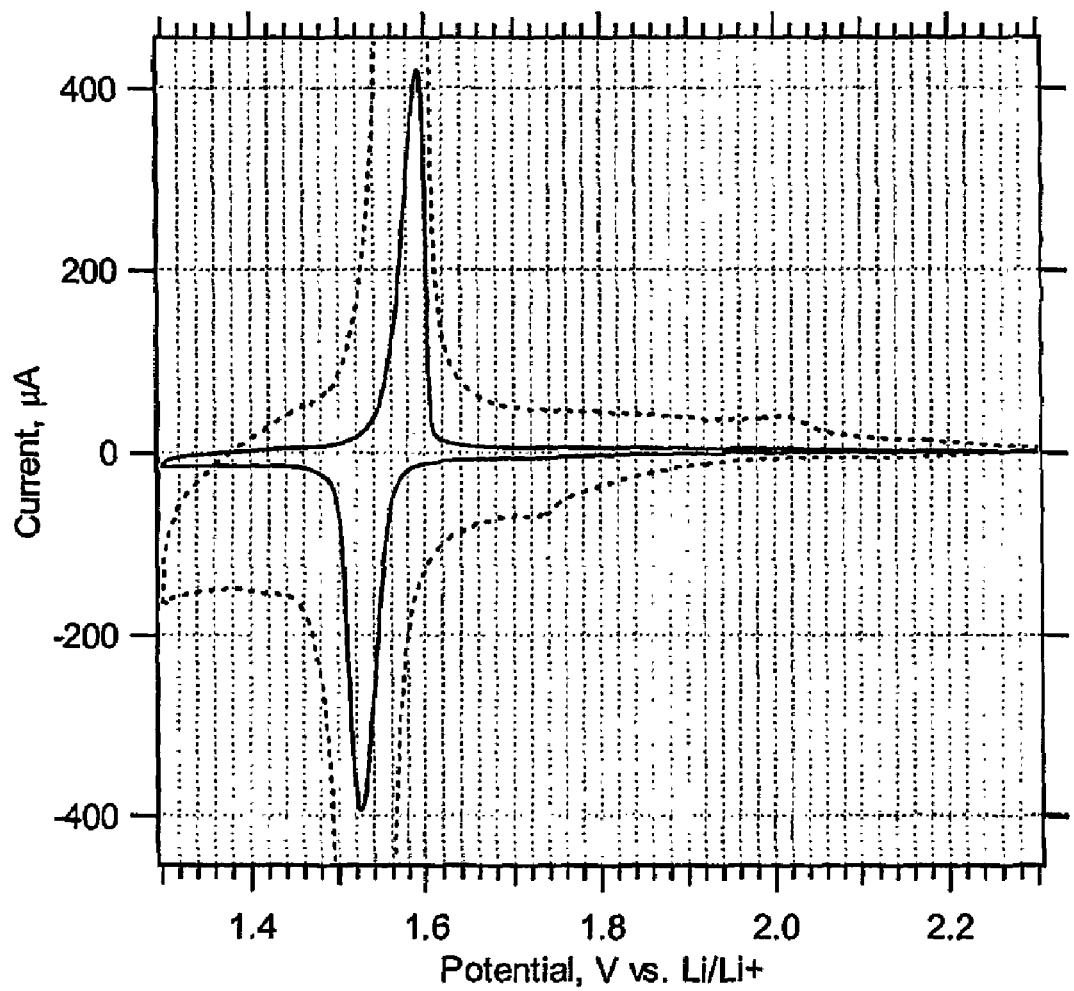
FIG. 2 shows a cyclic voltammogram of the material (A) shown in FIG. 1.

Cyclic voltammogram of the ex-butoxide material (A) evidences the Li-insertion into $Li_4Ti_5O_{12}$ spinel (FIG. 2). The formal potential of insertion equals 1.56 V vs. Li/Li$^+$, which matches the potential of ordinary microcrystalline $Li_4Ti_5O_{12}$. The small peaks at 1.75 and 2.0 V can be assigned to anatase. Assuming the insertion ratio Li/TiO$_2$ (anatase)=0.5, the integral peak area corresponds to the anatase content below 1%. In most samples, the anatase content was between 0.3-0.6%, and, sometimes, it was even not detectable. Note that the Li-insertion electrochemistry can serve as a very sensitive analytical method for the $Li_4Ti_5O_{12}$-TiO$_2$ mixture, which is superior to XRD (cf. FIG. 1/(A) and FIG. 2).

Figure 3A:
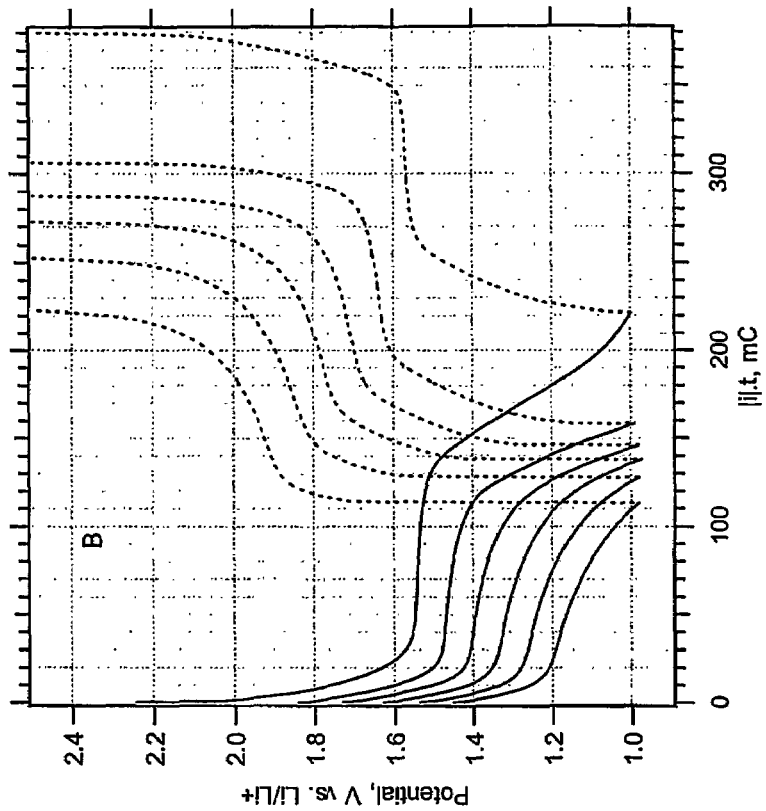
FIG. 3 shows galvanostatic charging/discharging cycles corresponding to different materials.
Figure 3B:
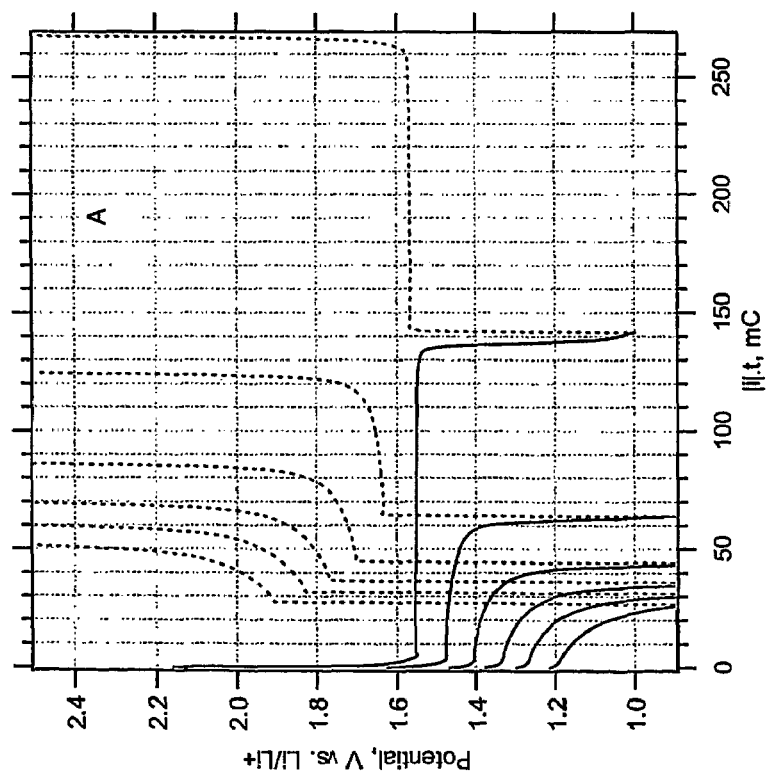

FIG. 3A displays a series of galvanostatic charging/discharging cycles of the same nanocrystalline electrode as in FIG. 2 at relatively very high charging rates: 2 C, 50 C, 100 C, 150 C, 200 C and 250 C. The maximum reversible Li-insertion capacity is 160 mC, and about 70% of this charge can still be cycled at 250 C with the same cut-off voltage. The commercial microcrystalline $Li_4Ti_5O_{12}$ shows only ca 19% of its nominal capacity in the 250 C-cycle (FIG. 3B). Fast charging is always reversible, but the nanocrystalline electrode shows considerable irreversibility at 2 C. This is apparently due to breakdown processes in the electrolyte solution, such as reduction of trace water, which is more pronounced at high-surface area electrodes. Within the experimental error of weighing of the electroactive film, the microcrystalline (LT-2) electrode gives the theoretical maximum insertion capacity (Eq 1), i.e. 630 C/g. The nanocrystalline electrodes usually showed capacities of ca. 550-610 C/g.

Details of the Discovery of the Particle Size Requirements for High Rate Charging of tetra-lithium titanate (Spinel):

A unique set of various size samples of tetra-Lithium Titanate was collected for study by the inventors. This unique set of samples ranged in surface area from approximately 1 m$^2$/gm to approximately 200 m$^2$/gm. The charging characteristics of tetra-Lithium Titanate (spinel) was determined as a function of Surface Area of the is active electrode powder. As a result of this study the charging performance of tetra-Lithium Titanate as a function of the surface area of the active electrode grade powder was discovered.

The unique and comprehensive set of samples was collected from 3-sources:
1. Commercial sources, that is companies who make and sell tetra-Lithium Titanate for use primarily in button cells (i.e. Titan Koygo), were used to procure some of the samples.
2. Altair NanoMaterials provided samples using its new process for producing particulate $Li_4Ti_5O_{12}$. We refer to U.S.A Provisional Patent Application 60/306,683, dated Jul. 20, 2001 and assigned to Altair NanoMaterials Inc. by the inventors Timothy M. Spitler and Jan Prochazka as a source of some of the materials.
3. Samples were produced and included the unique set of samples discussed in the previous chapters.

Preparation of electrodes used in measuring the charging characteristics of particulate tetra-Lithium Titanate samples acquired from commercial sources (item 1. above) and produced using the Altair NanoMaterials process (Item 2. above) proceeded as follows.

The $Li_4Ti_5O_{12}$ powder was dispersed in aqueous medium to form a viscous paste. The powder (1.0 g) was ground for at least 20 min in an agate or porcelain mortar under slow addition of 4×0.2 mL of 10% aqueous solution of acetylacetone. The mixture was diluted with 5 ml $H_2O$ and mixed with 2 mL of 4% aqueous solution of hydroxypropylcellulose (MW 100,000) and 2 mL of 10% aqueous solution of Triton-X100 (Fluka). The resulting viscous liquid was stirred overnight before use. When necessary, the mixture was further homogenized using a titanium ultrasonic horn (Bioblock Scientific; 80 W, 30×2 s pulses). The obtained paste was deposited on a sheet of conducting glass (F-doped $SnO_2$, 8 Ω/square) using a doctor-blading technique. The sheet of conducting glass had dimensions: 3×5×0.3 $cm^3$. A Scotch-tape at both edges of the support (0.5 cm) defined the film's thickness and left part of the support uncovered for electrical contact. The film was finally calcined for 30 min in air at 500° C. After cooling down to room temperature, the sheet was cut into ten electrodes 1.5×1 $cm^2$ in size; the geometric area of the $TiO_2$ film was 1×1 $cm^2$. The as-deposited films were controlled by optical microscope, by a simple scratch test (surface scratched by a piece of glass to check the sintering of particles) and by an alpha-step profilometer. The latter method provided information about layer thickness and surface corrugation. The film's mass was determined after scraping the $TiO_2$ layer from the $SnO_2(F)$ support by a piece of glass sheet. The layer thickness was about 1-5 μm. No signs of electrode "aging" (cracking, delaminating) were found, even after many repeated tests of the same electrode. The mass of active electrode material was typically 0.1-0.4 mg/$cm^2$; the projected area was 1 $cm^2$.

It is to be noted that when $Li_4Ti_5O_{12}$ was produced as a slurry, this slurry was mixed with hydroxypropylcellulose and Triton-X in the same proportions as with the powder samples. The electrodes were fabricated and tested by the same methods as mentioned above.

Electrochemical Measurements of Electrodes:

Electrochemical measurements were carried out in a one-compartment cell using an Autolab Pgstat-20 (Ecochemie) controlled by GPES-4 software. The reference and auxiliary electrodes were made of Li metal, hence, potentials are referred to the Li/$Li^+$ (1M) reference electrode. LiN$(CF_3SO_2)_2$ was dried at 130° C./1 mPa. Ethylene carbonate (EC) and 1,2-dimethoxyethane (DME) were dried over the 4A molecular sieve. The electrolyte solution, 1 M LiN$(CF_3SO_2)_2$+EC/DME (1/1 by mass) contained 10-15 ppm $H_2O$ as determined by Karl Fischer titration. All operations were carried out in a glove box.

A total of 25 electrodes were prepared and tested according to the method of preparation and the experimental setup given above. XRD analysis of these samples showed that they are formed of pure $Li_4Ti_5O_{12}$ with less than 1% free TiO2 in the rutile or anatase phase.

For each example, galvanostatic chronopotentiometry curves at different charging and discharging rates were measured.

The results obtained with all the samples are summarized in Table 1, the raw data table. Separate measurements confirm that up to a charging rate of 2 C (such that complete charging would be completed in ½ h; a charging rate of 1 C corresponds to full charge in 1 h), all samples exhibit the same maximum charge quantity. This number is considered as the full capacity of the given sample. Table 1 shows the specific surface area as well as the charging capacity (mC, milli Coulombs) measured for each example. Please note that as the actual mass of tetra-Lithium Titanate (spinel) varied on each electrode, so did the actual charge/discharge currents at the given charging rates.

TABLE 1

Raw data

| Sample | $S_{BET}$ ($m^2$/g) | $S_{BET}$ ($m^2$/g) calcined | $Q_2$ (mC) | $Q_{50}$ (mC) | $Q_{100}$ (mC) | $Q_{150}$ (mC) | $Q_{200}$ (mC) | $Q_{250}$ (mC) |
|---|---|---|---|---|---|---|---|---|
| | | | | | Reversible charge quantity (Q) in milliCoulombs at various charging rates. | | | |
| 1 | 1.3 | 1.3 | 58 | 8.2 | 5.4 | 4.2 | 3.9 | 3.5 |
| 2 | 3.1 | 3.1 | 125 | 60 | 42 | 30 | 29 | 25 |
| 3 | 3.2 | 3.2 | 76 | 36 | 26 | 21 | 17 | 12 |
| 4 | 4.6 | 4.0 | 84 | 58 | 46 | 41 | 34 | 23 |
| 5 | 7.5 | 7.5 | 118 | 86 | 64 | 55 | 51 | 34 |
| 6 | 11.0 | 11.0 | 120 | 107 | 92 | 84 | 70 | 55 |
| 7 | 17.4 | 18.3 | 125 | 122 | 117 | 108 | 90 | 71 |
| 8 | 24.3 | 24.0 | 135 | 120 | 117 | 105 | 88 | 65 |
| 9 | 27.1 | 27.0 | 122 | 115 | 112 | 111 | 111 | 108 |
| 10 | 32.3 | 32.2 | 150 | 140 | 139 | 135 | 125 | 110 |
| 11 | 40.5 | 37.3 | 178 | 165 | 160 | 140 | 115 | 73 |
| 12 | 51.4 | 39.4 | 145 | 128 | 125 | 120 | 115 | 105 |
| 13 | — | 53 | 137 | 132 | 126 | 121 | 111 | 84 |
| 14 | 54.0 | 37.0 | 159 | 157 | 152 | 145 | 121 | 84 |
| 15 | 70.4 | 69.7 | 202 | 195 | 191 | 175 | 155 | 120 |
| 16 | 75.2 | 61.1 | 150 | 145 | 142 | 140 | 131 | 119 |
| 17 | 85.9 | 68.7 | 106 | 105 | 100 | 99 | 92 | 83 |
| 18 | 99.4 | 79.5 | 181 | 175 | 170 | 166 | 152 | 135 |
| 19 | — | 105 | 132 | 128 | 121 | 114 | 108 | 86 |
| 20 | 107 | 85.7 | 148 | 142 | 141 | 139 | 135 | 125 |
| 21 | — | 119 | 95 | 91 | 88 | 86 | 83 | 78 |
| 22 | 135 | 91.4 | 138 | 132 | 129 | 125 | 121 | 110 |
| 23 | — | 153 | 118 | 108 | 99 | 91 | 85 | 74 |
| 24 | — | 183 | 158 | 151 | 142 | 135 | 127 | 112 |
| 25 | — | 196 | 133 | 122 | 112 | 103 | 96 | 83 |

Table 1, the raw data table, was processed to produce Table 2, which normalizes the data set to 100% charge capacity at 2 C_rate. Table 2 expresses observed capacities as a % of the capacity of sample at 2 C. A number smaller than 100% corresponds to a loss of capacity at higher charging rate.

TABLE 2

Processed data: normalized at 2C-rate equals 100% of charge capacity

| Sample | $S_{BET}$ ($m^2$/g) | $S_{BET}$ ($m^2$/g) calcined | $Q_{50}$ (72 sec) | $Q_{100}$ (36 sec) | $Q_{150}$ (24 sec) | $Q_{200}$ (18 sec) | $Q_{250}$ (14 sec) |
|---|---|---|---|---|---|---|---|
| | | | Charging capacity in % of the capacity at slow charging rate (1800 s) | | | | |
| 1 | 1.3 | 1.3 | 14.1 | 9.3 | 7.2 | 6.7 | 5.0 |
| 2 | 3.1 | 3.1 | 48.0 | 33.6 | 24.0 | 23.2 | 20.0 |
| 3 | 3.2 | 3.2 | 47.4 | 34.2 | 27.6 | 22.4 | 16.0 |
| 4 | 4.6 | 4.0 | 69.0 | 54.8 | 48.8 | 40.5 | 27.0 |
| 5 | 7.5 | 7.5 | 72.9 | 54.2 | 46.6 | 43.2 | 28.8 |
| 6 | 11.0 | 11.0 | 89.2 | 76.7 | 70.0 | 58.3 | 44.0 |
| 7 | 17.4 | 18.3 | 97.6 | 93.6 | 86.4 | 72.0 | 58.0 |
| 8 | 24.3 | 24.0 | 88.9 | 86.7 | 77.8 | 65.2 | 43.0 |
| 9 | 27.1 | 27.0 | 94.3 | 91.8 | 91.0 | 91.0 | 87.0 |
| 10 | 32.3 | 32.2 | 93.3 | 92.7 | 90.0 | 83.3 | 75.0 |
| 11 | 40.5 | 37.3 | 92.7 | 89.9 | 78.7 | 64.6 | 41.0 |
| 12 | 51.4 | 39.4 | 88.3 | 86.2 | 82.8 | 79.3 | 73.0 |
| 13 | — | 53 | 96.4 | 92.0 | 88.3 | 81.0 | 61.3 |
| 14 | 54.0 | 37.0 | 53.93 | 95.6 | 91.2 | 76.1 | 54.0 |
| 15 | 70.4 | 69.7 | 70.43 | 94.6 | 86.6 | 76.7 | 59.0 |
| 16 | 75.2 | 61.1 | 75.20 | 94.7 | 93.3 | 87.3 | 79.5 |
| 17 | 85.9 | 68.7 | 85.89 | 94.3 | 93.4 | 86.8 | 78.0 |
| 18 | 99.4 | 79.5 | 99.42 | 93.9 | 91.7 | 84.0 | 75.0 |
| 19 | — | 105 | 97.0 | 91.7 | 86.4 | 81.8 | 65.2 |
| 20 | 107 | 85.7 | 95.9 | 95.3 | 93.9 | 91.2 | 83.0 |
| 21 | — | 119 | 95.8 | 92.6 | 90.5 | 87.4 | 82.1 |
| 22 | 135 | 91.4 | 95.7 | 93.5 | 90.6 | 87.7 | 80.0 |
| 23 | — | 153 | 91.5 | 83.9 | 77.1 | 72.0 | 62.7 |
| 24 | — | 183 | 95.6 | 89.9 | 85.4 | 80.4 | 70.9 |
| 25 | — | 196 | 91.7 | 84.2 | 77.4 | 72.2 | 62.4 |

The results of Table 2, the processed data table, are plotted on a logarithmic scale in FIGS. 4 to 8 each figure presenting the data at a particular rate of charging using the C_rate system. Samples that did not maintain charge capacity of at least 80% of the full charge capacity (the 2 C_rate charge) were viewed as materials that failed the testing.

Some general trends are apparent. Clearly, as the charging rate is increased, the charging capacity decreases for the particles with small surface area, while the charging capacity of the particles with large surface area is substantially maintained. As the production of the data set Table 1 is a substantial art, the data is necessarily "noisy". Despite the "noise" of the measurement process some clear performance plateaus are visible. These performance plateaus provide sufficient guidance for a manufacturer to design and produce tetra-Lithium Titanate that conforms to "guaranteed" performance requirements.

EXAMPLE 1a

Figure 4:
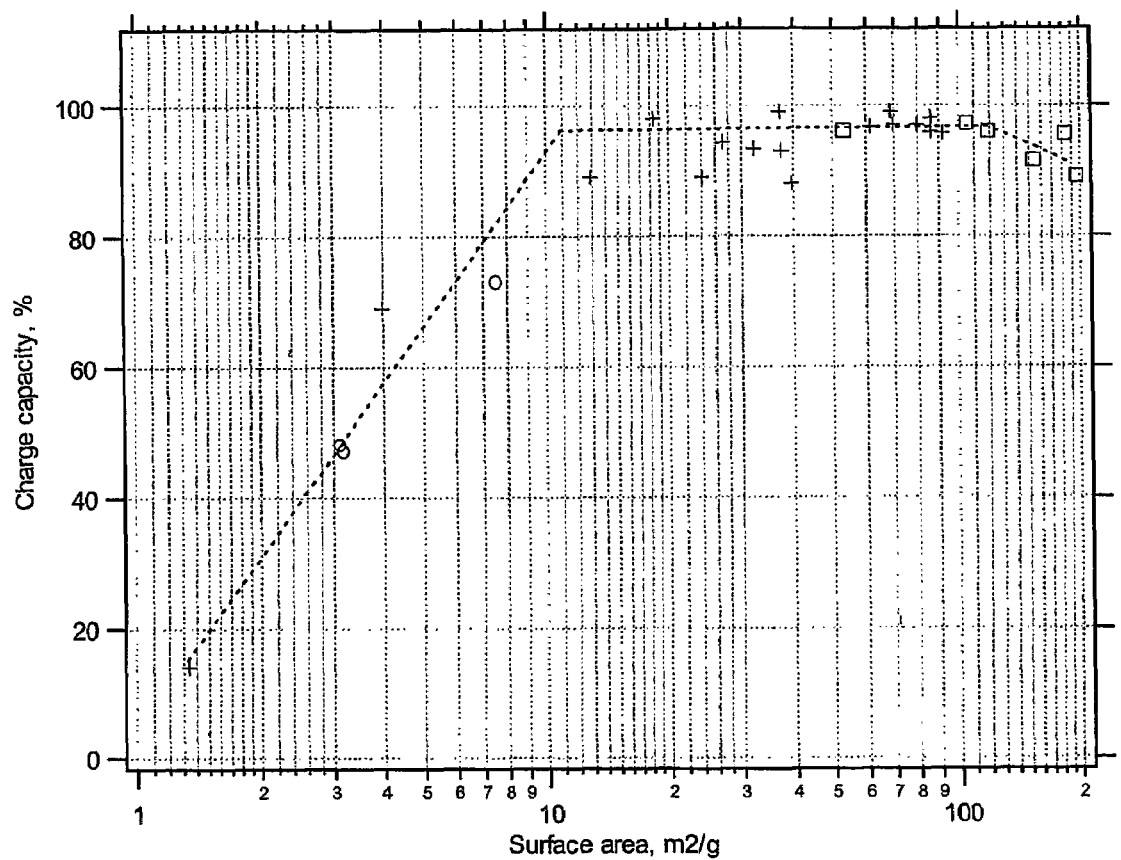
FIG. 4 shows 50 C rate data corresponding to a material according to the invention.

The 50 C_Rate Data Set as Plotted in FIG. 4 and Contained in Table 1

These data show that particulate tetra-Lithium Titanate qualifies for use in anode or cathode service in energy storage devices based on Li+ion electron pair insertion/desertion cycles that function at a 50 C_rate. Using a pass/fail test based on equal to or greater that 90% working charge capacity passes and less than 90% fails, the test data may be screened to produce two subsets. This screening process is shown graphically in FIG. 4. On an individual sample basis a qualified performance range was determined, that range being a surface area of equal to or greater than 10 $m^2/g$ to equal to or less than 200 $m^2/g$.

EXAMPLE 2a

Figure 5:
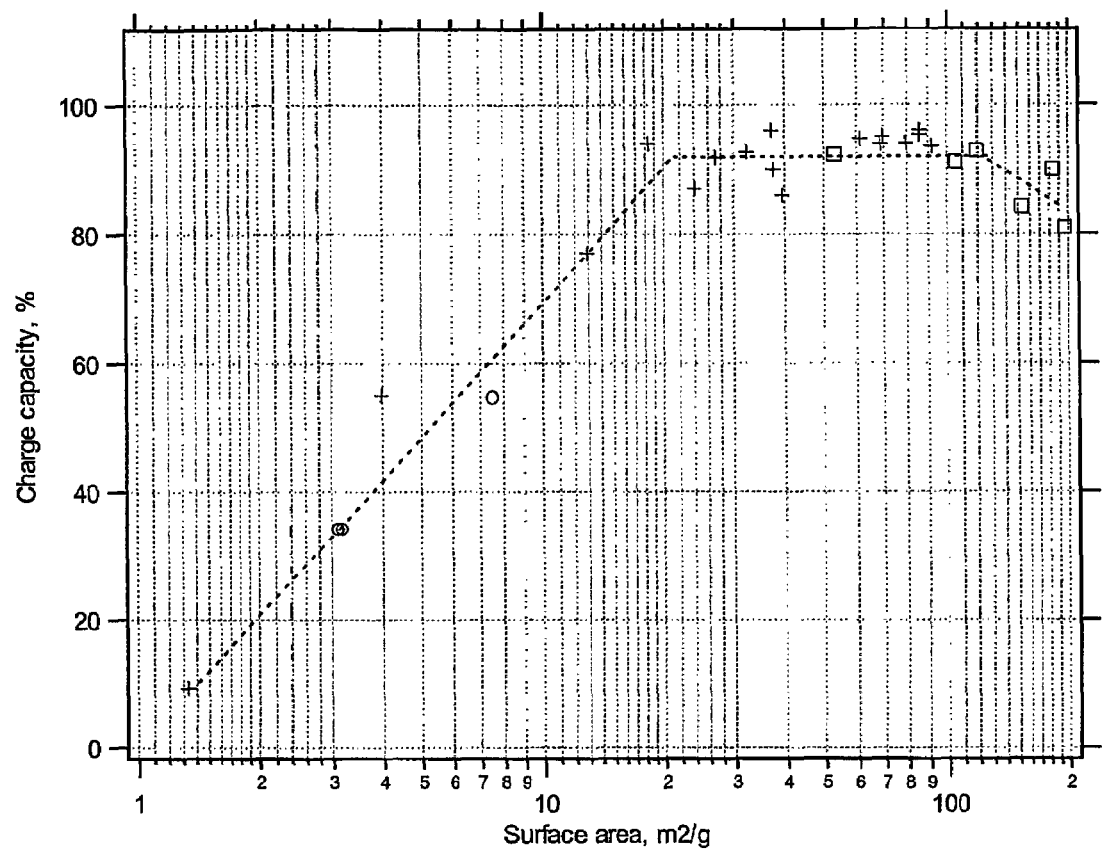
FIG. 5 shows 100 C rate data corresponding to a material according to the invention.

The 100 C_Rate Data Set as Plotted in FIG. 5 and Contained in Table 1

These data show that particulate tetra-Lithium Titanate qualifies for use in anode or cathode service in energy storage devices based on $Li^+$ ion electron pair insertion/desertion cycles that function at a 100 C_rate. Using a pass/fail test based on equal to or greater that 90% working charge capacity passes and less than 90% fails, the test data may be screened to produce two subsets. This screening process is shown graphically in FIG. 5. On an individual sample basis a qualified performance range was determined, that range being a surface area of equal to or greater than 20 $m^2/g$ to equal to or less than 160 $m^2/g$.

EXAMPLE 3a

Figure 6:
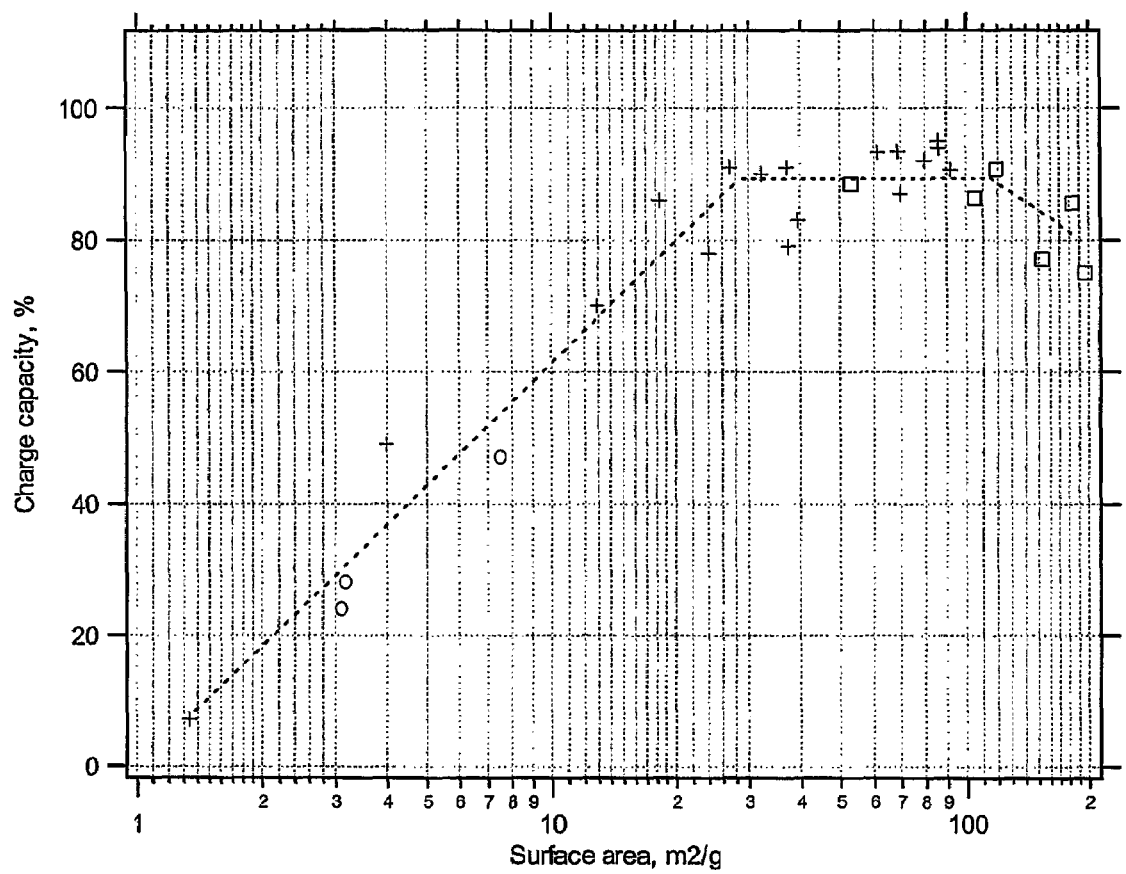
FIG. 6 shows 150 C rate data corresponding to a material according to the invention.

The 150 C_Rate Data Set as Plotted in FIG. 6 and Contained in Table 1

These data show that particulate tetra-Lithium Titanate qualifies for use in anode or cathode service in energy storage devices based on $Li^+$ ion electron pair insertion/desertion cycles that function at a 150 C_rate. Using a pass/fail test based on equal to or greater that 80% working charge capacity passes and less than 80% fails, the test data may be screened to produce two subsets. This screening process is shown graphically in FIG. 6. On an individual sample basis a qualified performance range was determined, that range being a surface area of equal to or greater than 30 $m^2/g$ to equal to or less than 140 $m^2/g$.

EXAMPLE 4a

Figure 7:
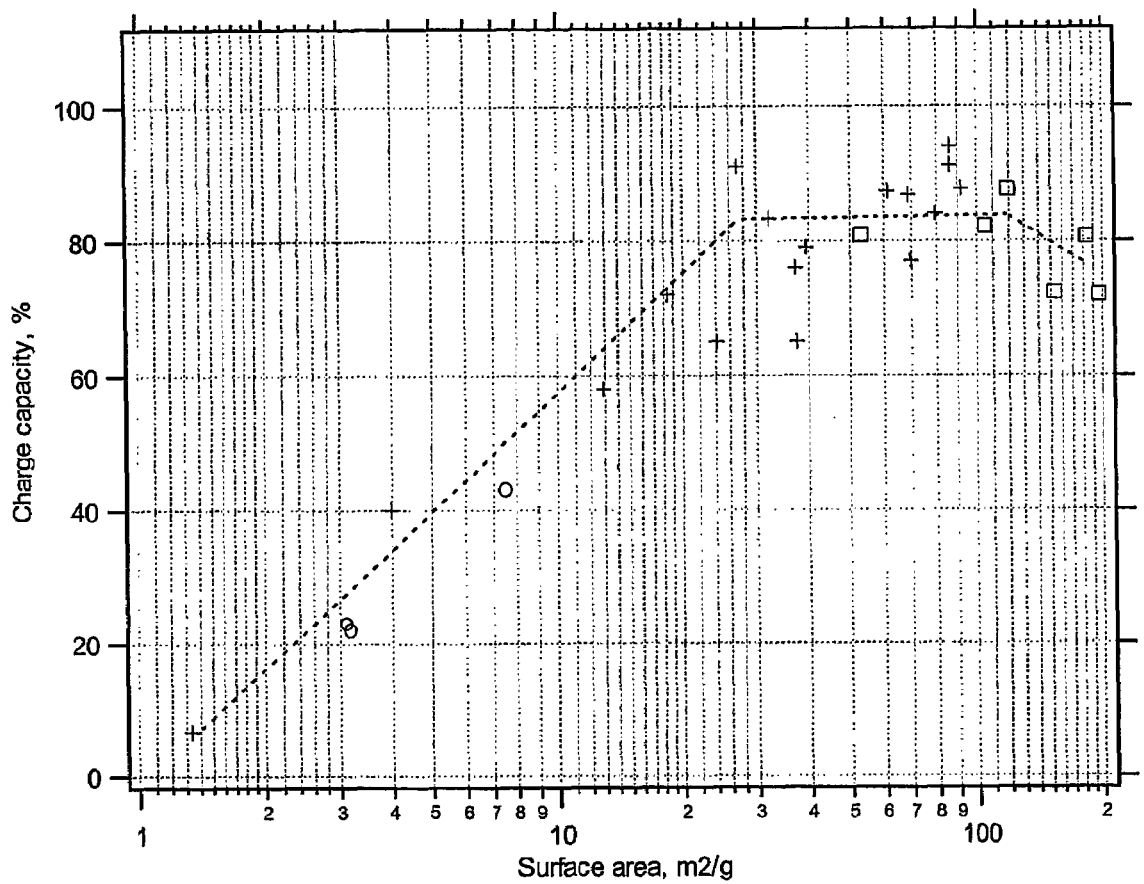
FIG. 7 shows 200 C rate data corresponding to a material according to the invention.

The 200 C_Rate Data Set as Plotted in FIG. 7 and Contained in Table 1

These data show that particulate tetra-Lithium Titanate qualifies for use in anode or cathode service in energy storage devices based on Li+ ion electron pair insertion/desertion cycles that function at a 200 C_rate. Using a pass/fail test based on equal to or greater that 80% working charge capacity passes and less than 80% fails, the test data may be screened to produce two subsets. This screening process is shown graphically in FIG. 7. On an individual sample basis a qualified performance range was determined, that range being a surface area of equal to or greater than 30 $m^2/g$ to equal to or less than 120 $m^2/g$.

EXAMPLE 5a

Figure 8:
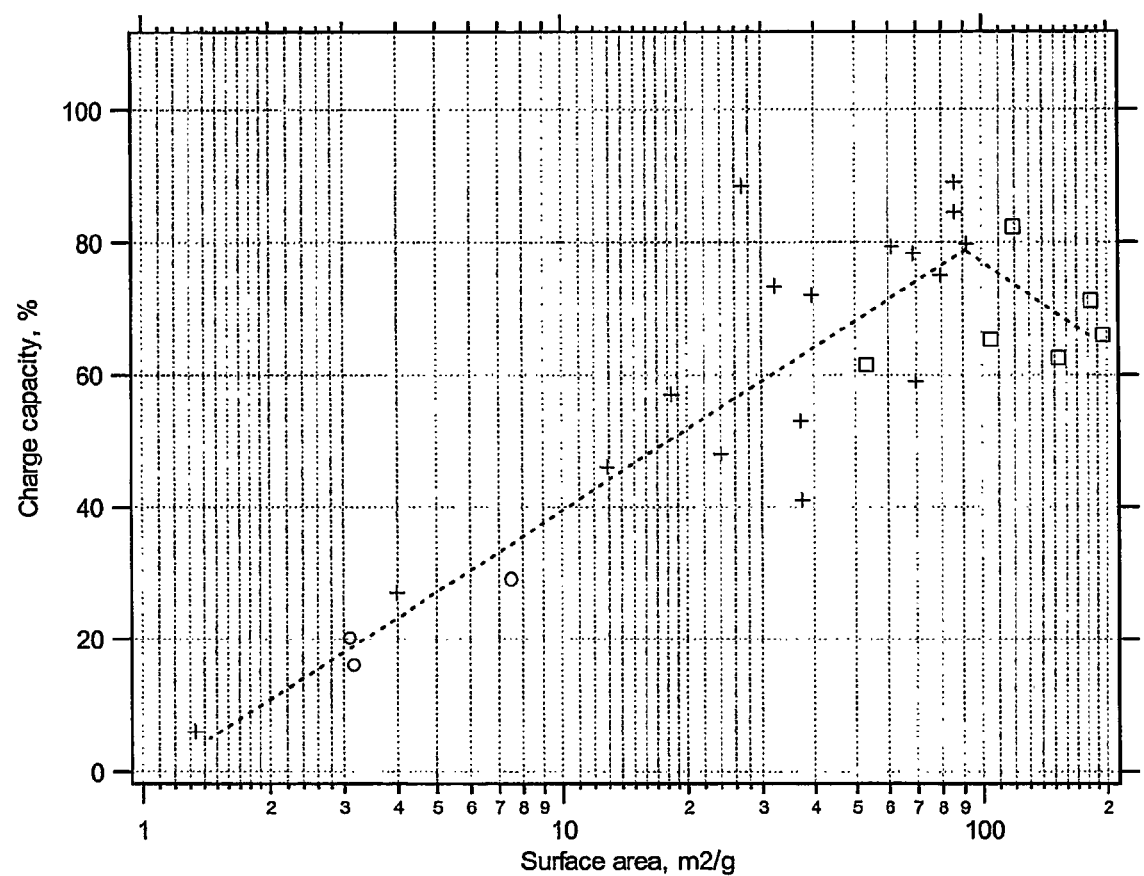
FIG. 8 shows 250 C rate data corresponding to a material according to the invention.

The 250 C_Rate Data Set as Plotted in FIG. 8 and Contained in Table 1

These data show that particulate tetra-Lithium Titanate qualifies for use in anode or cathode service in energy storage devices based on Li+ ion electron pair insertion/desertion cycles that function at a 250 C_rate. Using a pass/fail test based on equal to or greater that 80% working charge capacity passes and less than 80% fails, the test data may be screened to produce two subsets. This screening process is shown graphically in FIG. 8. On an individual sample basis a qualified performance range was not determined. The 250 C_rate data set appears as a "mountain" in FIG. 8. Graphically, a performance peak was determined at a BET-SA of 90 $m^2/g$.

One of the preferred BET-SA of particulate tetra-Lithium Titanate has been discovered by the inventors to be at least 70 $m^2/g$ but not more than 110 $m^2/g$.

The above examples show that the charging capacity corresponding to a given rate of charge increases with increasing surface area, reaches a plateau, then decreases as the surface area increases further.

Thereby (Examples 1a through 5a), the excellent electrochemical performance of nanocrystalline $Li_4Ti_5O_{12}$ is clearly demonstrated. Furthermore, it is to be noted that several different processes may be used to manufacture the particles according to invention.

The invention claimed is:

1. A process for manufacturing a thin film electrode comprising:
   a) providing a conductive support; and
   b) coating the conductive support with a $Li_4Ti_5O_{12}$ spinel material, wherein the $Li_4Ti_5O_{12}$ spinel material is formed by:
      1) preparing, in a liquid medium, a mixture comprising (i) a lithium alcoholate and (ii) a titanic acid ester; and
      2) hydrolyzing the mixture.

2. The process of claim 1 further comprising processing the hydrolyzed mixture with a polymer to form a homogenized product and heat treating the homogenized product to remove organic material.

3. The process of claim 2 wherein the conductive support is annealed after coating.

4. The process of claim 3 wherein the annealing is conducted at a temperature in the range of from about 400° to about 500° C.

5. The process of claim 1 wherein the $Li_4Ti_5O_{12}$ spinel material has a BET surface area of at least 10 $m^2/g$.

6. The process of claim 1 wherein the $Li_4Ti_5O_{12}$ spinel material has a BET surface area of between 10 and 200 $m^2/g$.

* * * * *